United States Patent
Yamada

[19]

[11] Patent Number: 5,949,915
[45] Date of Patent: Sep. 7, 1999

[54] IMAGE PROCESSING METHOD AND APPARATUS

[75] Inventor: Masahiko Yamada, Kanagawa-ken, Japan

[73] Assignee: Fuji Photo Film Co., Ltd., Kangawa-ken, Japan

[21] Appl. No.: 08/914,144

[22] Filed: Aug. 19, 1997

[30] Foreign Application Priority Data

Aug. 19, 1996 [JP] Japan .................................. 8-217333

[51] Int. Cl.$^6$ .............................. G06K 9/44; G06T 5/00
[52] U.S. Cl. ......................... 382/260; 382/263; 382/264; 382/299; 382/300
[58] Field of Search .................................. 382/260, 263, 382/264, 266, 269, 274, 275, 254, 132, 299, 300; 358/463

[56] References Cited

U.S. PATENT DOCUMENTS

4,315,318   2/1982   Kato et al. .
4,317,179   2/1982   Kato et al. .
5,051,902   9/1991   Hishinuma .............................. 382/263
5,454,044   9/1995   Nakajima ................................ 382/132

Primary Examiner—Scott Rogers
Attorney, Agent, or Firm—Sughrue, Mion, Zinn, Macpeak & Seas, PLLC

[57] ABSTRACT

A predetermined filtering process is carried out on an original image signal by using a predetermined filter, and a plurality of low-resolution image signals, which represent low-resolution images having different levels of resolution, are thereby formed. An interpolating and enlarging process is carried out on each of the low-resolution image signals, and a plurality of different unsharp mask image signals of the original image signal are thereby formed. Predetermined nonlinear processing is then carried out in accordance with the unsharp mask image signals and the original image signal. A filter having a filter factor determined in accordance with read-out density, with which the original image signal was acquired, is employed as the predetermined filter.

8 Claims, 11 Drawing Sheets

| 0.1 | 0.5 | 0.8 | 0.5 | 0.1 |

| 0.05 | 0.13 | 0.3 | 0.5 | 0.65 | 0.74 | 0.65 | 0.5 | 0.3 | 0.13 | 0.05 |

| 0.00 | 0.05 | 0.25 | 0.40 | 0.25 | 0.05 | 0.00 |

FIG. 13

| 0.04 | 0.12 | 0.21 | 0.26 | 0.21 | 0.12 | 0.04 |

IMAGE PROCESSING METHOD AND APPARATUS

BACKGROUND OF THE INVENTION

1. Field of the Invention

This invention relates to an image processing method and apparatus for carrying out a predetermined filtering process on an original image signal, thereby forming an unsharp mask image signal, and carrying out nonlinear processing, such as frequency emphasis processing, by using the unsharp mask image signal. This invention particularly relates to characteristics of a filter utilized for forming the unsharp mask image signal.

2. Description of the Prior Art

The applicant has proposed various image processing methods and apparatuses, wherein frequency emphasis processing or dynamic range compression processing is carried out by using an unsharp mask image signal, and a radiation image, which has good image quality and can serve as an effective tool in, particularly, the efficient and accurate diagnosis of an illness, is thereby obtained. (Such techniques are described in, for example, U.S. Pat. Nos. 4,315,318; 4,317,179; 5,454,044 and U.S. Ser. No. 08/723,313.)

The unsharp mask image signal represents an image, which is constituted of the same number of picture elements as that of the picture elements of the original image, which is represented by an original image signal, and has sharpness lower than the sharpness of the original image. The unsharp mask image signal is formed by carrying out a predetermined filtering process with respect to each of picture elements of the original image represented by the original image signal, which are selected at predetermined intervals, thereby thinning out the picture elements, and thereafter interpolating the picture elements, which were removed by the filtering process, in accordance with a predetermined interpolating operation.

As the predetermined filtering process, a process for removing high frequency components of the original image signal by using a low pass filter is employed. Specifically, a process for calculating the mean value or the weighted mean value of the values of the picture elements located within a filter is employed. In an example of the filtering process, after the filtering process has been carried out on the original image signal and a signal representing an image constituted of a smaller number of picture elements than that of the picture elements of the original image has been obtained, the filtering process is repeated on the thus obtained signal. In this manner, a plurality of image signals representing the images constituted of a small number of picture elements are obtained in the respective stages of the filtering. An interpolating operation is then carried out on each of the thus obtained image signals, and signals representing images constituted of the same number of picture elements as that of the picture elements of the original image are thereby obtained. In this manner, a plurality of different unsharp mask image signals are formed.

Each of the thus formed unsharp mask image signals represents the components of the original image signal, which fall within a predetermined frequency band. Also, a signal representing the frequency components of a further limited frequency band can be obtained by calculating the difference between different unsharp mask image signals. Such a technique is employed when the components of the original image signal, which fall within a specific frequency band, are to be processed in frequency emphasis processing, dynamic range compression processing, or the like. For example, nonlinear processing is carried out, wherein frequency emphasis is conducted by restricting the signal of a specific frequency band and adding the resulting signal to the original image signal.

As described above, the unsharp mask image signal is formed from the original image signal. The original image signal is obtained by reading out the original image with a predetermined read-out density by use of a read-out apparatus and thereby obtaining a digital signal. It has been known that, when a visible image is reproduced as a print, or the like, from the digitized image signal, the frequency components not higher than a certain frequency (Nyquist frequency), which is determined by the read-out density, are reproduced accurately. Specifically, the read-out density is determined by considering the image quality level required for the reproduced image, and therefore is not necessarily set to be a fixed value.

For example, in radiation image read-out and reproducing systems described in the references cited above, a stimulable phosphor sheet, on which a radiation image of an object, such as a human body, has been recorded, is scanned with a laser beam, and the radiation image is thereby read out as a digital image signal. The read-out density is set to be one of different values in accordance with the size of the stimulable phosphor sheet.

In cases where filtering processes with the same low pass filter and interpolating processes with the same interpolating operation are carried out on image signals, which have been obtained with different read-out densities, i.e. the image signals having different Nyquist frequencies, the frequency characteristics of the obtained unsharp mask image signals vary for different read-out densities. Therefore, the problems occur in that, for example, in cases where a single original image is read out with two kinds of read-out densities and two kinds of original image signals representing the original image are thereby obtained, even if the frequency emphasis processing or the dynamic range compression processing is carried out by using the same unsharp mask image signal, the frequency band, which is emphasized, or the frequency band, which is compressed, will vary for the two kinds of the original image signals.

SUMMARY OF THE INVENTION

The primary object of the present invention is to provide an image processing method, wherein unsharp mask image signals having the same frequency characteristics are capable of being formed regardless of read-out density, and desired nonlinear processing, e.g. processing for emphasizing frequency components of a specific frequency band, is thereby carried out in an identical manner for original image signals having been obtained with different read-out densities.

Another object of the present invention is to provide an apparatus for carrying out the image processing method.

The present invention provides an image processing method, comprising the steps of:

i) reading out an original image with a predetermined read-out density, an original image signal, which represents the original image constituted of a plurality of picture elements, being thereby obtained, ii) carrying out a predetermined filtering process on the original image signal by using a predetermined filter, a first low-resolution image signal, which represents a first low-resolution image constituted of a smaller number of picture elements than that of picture elements of the original image represented by the original image signal, being thereby formed, iii) carrying out the filtering process on the first low-resolution image signal, a second low-resolution image signal, which represents a second low-resolution image constituted of a smaller number of picture elements than that of picture elements of the first low-resolution image, being thereby formed, iv) successively carrying out the filtering process on the respective low-resolution image signals, which are thus obtained successively, a plurality of low-resolution image signals, which represent low-resolution images having different levels of resolution, being thereby formed, v) carrying out an interpolating and enlarging process on each of the low-resolution image signals such that the number of picture elements of the low-resolution image represented by each low-resolution image signal may become identical with the number of picture elements of the original image represented by the original image signal, a plurality of different unsharp mask image signals of the original image signal being thereby formed, and vi) carrying out predetermined nonlinear processing in accordance with the unsharp mask image signals and the original image signal, wherein a filter having a filter factor, which is determined in accordance with the read-out density, is employed as the predetermined filter.

Examples of the nonlinear processing include frequency emphasis processing for emphasizing specific frequency components of the original image signal, and dynamic range compression processing for lowering the contrast of a high image density region, a low image density region, or the entire image such that the dynamic range, i.e. the difference between the maximum image density and the minimum image density of the original image, may be narrowed. The unsharp mask image signals need not necessarily be utilized for carrying out the nonlinear processing and may be utilized for forming images having sharpness lower than the sharpness of the original image.

The predetermined filter may be a filter for removing high frequency components not lower than a predetermined frequency, such as a low pass filter for calculating the mean value of the values of the picture elements located within the filter. In cases where the predetermined filtering process is carried out on the original image signal, an operation using the filter is carried out with respect to each of the picture elements of the original image represented by the original image signal, the picture elements being selected at predetermined intervals, e.g. at intervals of a single picture element. With the filtering process, the picture elements of the original image represented by the original image signal are thinned out such that the number of picture elements of a filtering-processed image, which is obtained from the filtering, may become smaller than that of the picture elements of the original image. As the operation for the interpolating and enlarging process, one of various known operations, such as a B spline interpolating operation, may be employed.

The present invention also provides an apparatus for carrying out image processing with the image processing method in accordance with the present invention. Specifically, the present invention also provides an image processing apparatus, comprising:

i) a filtering means for:
  receiving an original image signal, which has been obtained by reading out an original image with a predetermined read-out density and represents the original image constituted of a plurality of picture elements, carrying out a predetermined filtering process on the original image signal by using a predetermined filter, a first low-resolution image signal, which represents a first low-resolution image constituted of a smaller number of picture elements than that of picture elements of the original image represented by the original image signal, being thereby formed, carrying out the filtering process on the first low-resolution image signal, a second low-resolution image signal, which represents a second low-resolution image constituted of a smaller number of picture elements than that of picture elements of the first low-resolution image, being thereby formed, and successively carrying out the filtering process on the respective low-resolution image signals, which are thus obtained successively, a plurality of low-resolution image signals, which represent low-resolution images having different levels of resolution, being thereby formed, ii) an interpolating and enlarging means for carrying out an interpolating and enlarging process on each of the low-resolution image signals such that the number of picture elements of the low-resolution image represented by each low-resolution image signal may become identical with the number of picture elements of the original image represented by the original image signal, a plurality of different unsharp mask image signals of the original image signal being thereby formed, iii) a nonlinear processing means for carrying out predetermined nonlinear processing in accordance with the unsharp mask image signals and the original image signal, iv) a read-out density information input means for inputting information representing the read-out density, and v) a filter factor selecting means for selecting a filter factor of the predetermined filter from a plurality of filter factors, which have been stored previously, the selection being made in accordance with the read-out density, which is inputted as the information from the read-out density information input means.

With the image processing method and apparatus in accordance with the present invention, the unsharp mask image signals are formed by successively carrying out the predetermined filtering process on the original image signal and the low-resolution image signals, which are obtained successively, and the nonlinear processing, such as the frequency emphasis processing, is carried out by using the unsharp mask image signals. In such cases, the characteristics of the filter used for forming the unsharp mask image signals are set in accordance with the read-out density, with which the original image was read out. Therefore, even if the read-out density varies, the unsharp mask image signals having the same frequency characteristics can be formed. Accordingly, the nonlinear processing can be carried out in an identical manner for original image signals, which have been obtained with different read-out densities. As a result, results of the image processing can be obtained such that the results may not be affected by the read-out densities, with which the original image signals were obtained.

DESCRIPTION OF THE PREFERRED EMBODIMENTS

The present invention will hereinbelow be described in further detail with reference to the accompanying drawings.

In the embodiment described below, unsharp mask image signals are formed from an original image signal having been obtained by reading out a radiation image of a human body from a stimulable phosphor sheet, on which the radiation image has been recorded. Frequency emphasis processing, dynamic range compression processing, or the like, is then carried out by using the unsharp mask image signals such that an image may be obtained, which has good image quality and can serve as an effective tool in the efficient and accurate diagnosis of an illness. A visible image is then reproduced on photographic film, or the like, from the processed image signal, which has been obtained from the processing, and utilized in making a diagnosis.

Figure 1:
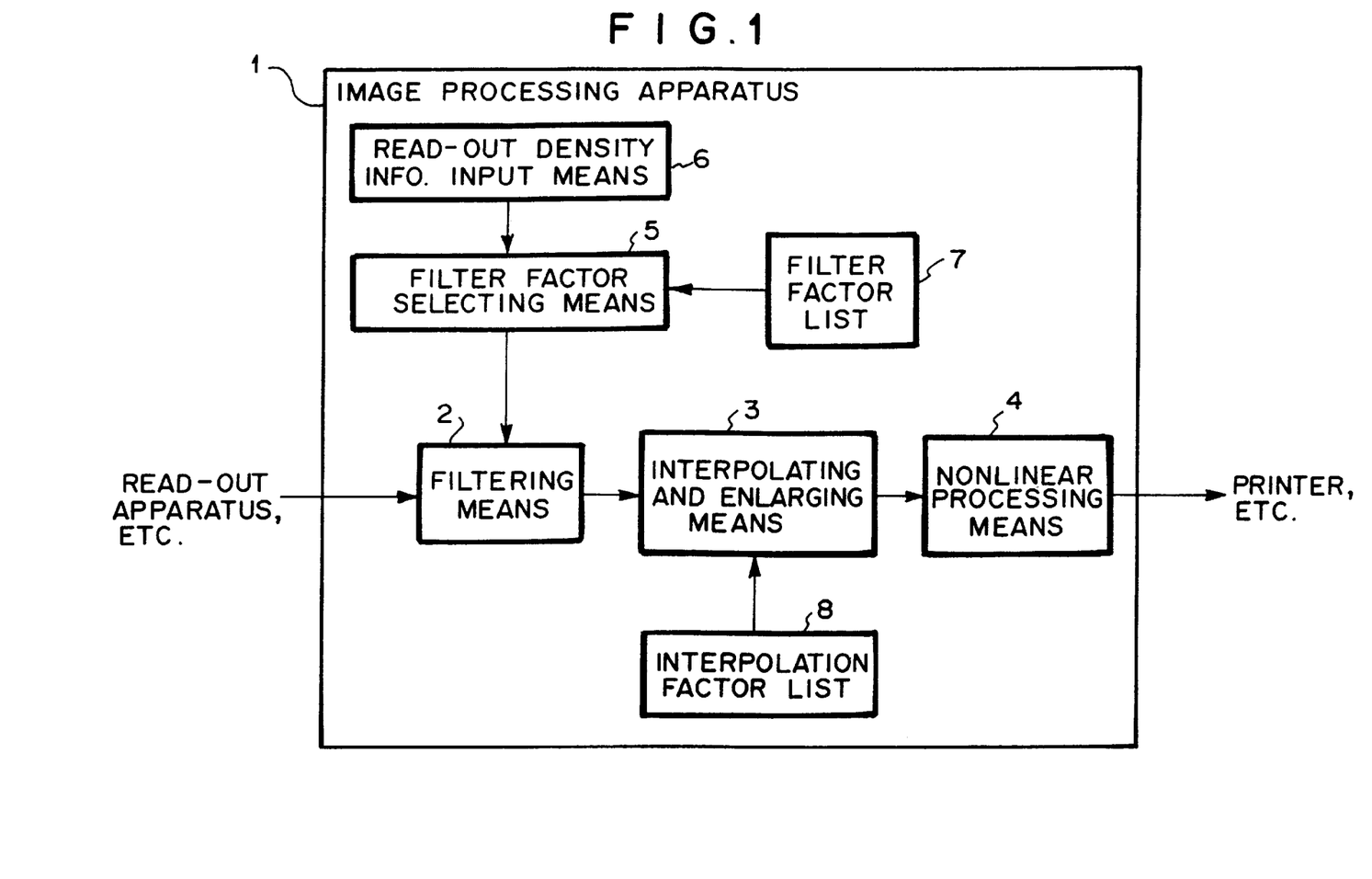
FIG. 1 is a block diagram showing an embodiment of the image processing apparatus in accordance with the present invention.

FIG. 1 is a block diagram showing an embodiment of the image processing apparatus in accordance with the present invention. With reference to FIG. 1, as a means for forming the unsharp mask image signals, an image processing apparatus 1 comprises a filtering means 2 for carrying out a filtering process, and an interpolating and enlarging means 3 for carrying out an interpolating and enlarging process by using an interpolation factor, which has been stored as an interpolation factor list 8. The image processing apparatus 1 also comprises a nonlinear processing means 4 for carrying out nonlinear processing in accordance with the characteristics of a processed image which is to be obtained, such as frequency emphasis processing. The image processing apparatus 1 stores several kinds of filter factors as a filter factor list 7. A filter factor selecting means 5 selects one kind of filter factor from the filter factor list 7, and the filtering means 2 utilizes the selected filter factor. The selection of the filter factor is made in accordance with a readout density, with which the original image signal subjected to the processing was obtained. A read-out density information input means 6 serves as a means for specifying the read-out density information.

In order for the read-out density information to be inputted with the read-out density information input means 6, the user may input a value of the read-out density from a keyboard. Alternatively, several kinds of read-out densities may be displayed on a display screen, and the user may select one kind of the read-out density from the displayed read-out densities. As another alternative, the original image signal and the corresponding read-out density information may be fed from the apparatus for reading out the radiation image into the image processing apparatus 1, and the image processing apparatus 1 may detect the read-out density information, which corresponds to the original image signal received from the image read-out apparatus. Thus the read-out density information input means 6 may take on any form, with which the image processing apparatus 1, specifically the filter factor selecting means 5, can recognize the read-out density corresponding to the original image signal.

Figure 2:
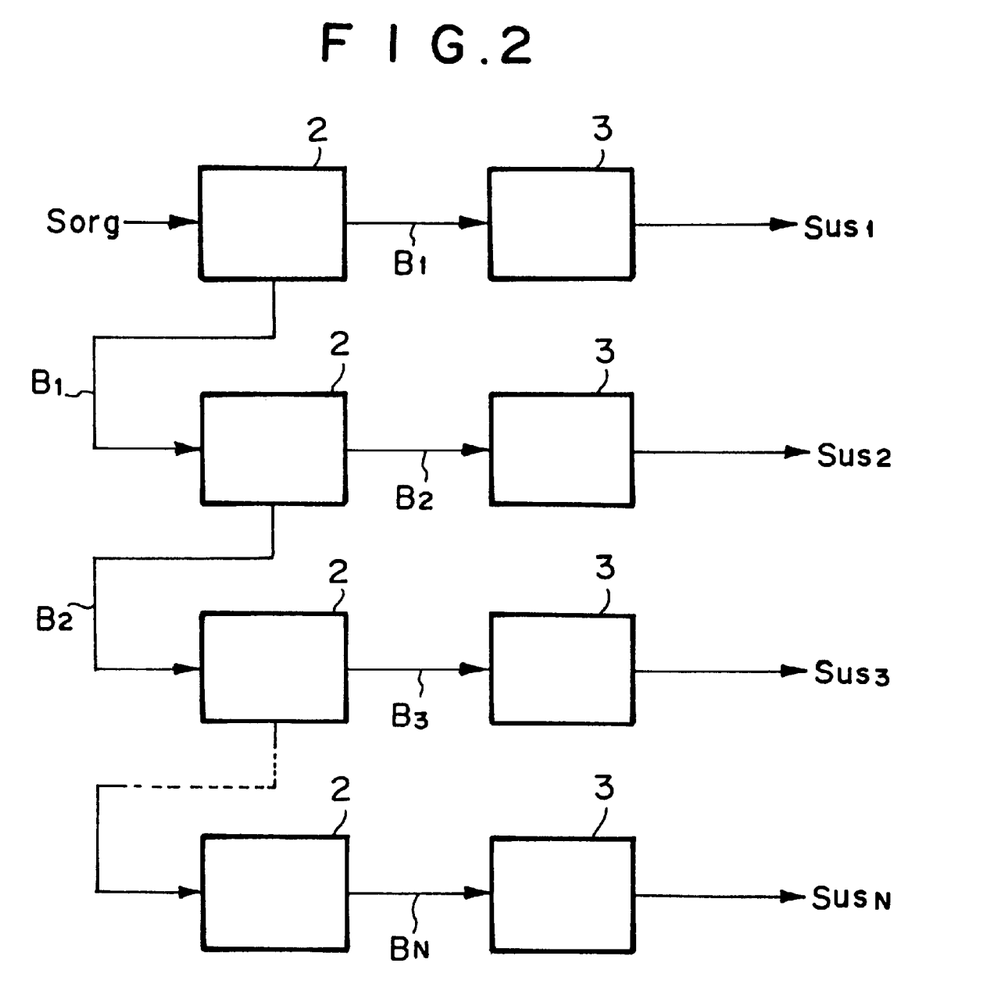
FIG. 2 is a block diagram showing how a plurality of unsharp mask image signals are formed.

How the unsharp mask image signals are formed, i.e. how the filtering means 2 and the interpolating and enlarging means 3 operate, will be described hereinbelow. FIG. 2 is a block diagram showing how a plurality of unsharp mask image signals are formed. As illustrated in FIG. 2, the filtering means 2 carries out the filtering process on an original image signal Sorg. The filtering process is carried out along each of x and y directions in the array of picture elements of the original image, which is represented by the original image signal Sorg. In this manner, a first low-resolution image signal $B_1$, which has resolution lower than the resolution of the original image signal Sorg, is formed. Thereafter, the filtering process is carried out in the same manner on the first low-resolution image signal $B_1$, and a second low-resolution image signal $B_2$, which has resolution lower than the resolution of the first low-resolution image signal $B_1$, is thereby formed. The filtering process is further carried out successively on respective low-resolution image signals, which are thus obtained successively. The interpolating and enlarging means 3 carries out the interpolating and enlarging process on each of the low-resolution image signals, which are obtained in the respective stages of the filtering process. From the interpolating and enlarging process, a plurality of unsharp mask image signals Sus1 through SusN, which have different levels of sharpness, are obtained.

In this embodiment, as the filter for the filtering process, a filter approximately corresponding to a one-dimensional Gaussian distribution is employed. Specifically, the filter factor of the filter is determined in accordance with Formula (1) shown below, which concerns the Gaussian signal.

$$f(t) = e^{-\frac{t^2}{2\sigma^2}} \qquad (1)$$

The Gaussian signal has good locality characteristics both in the frequency space and in the spatial domain and is therefore utilized in this embodiment.

Figure 3:
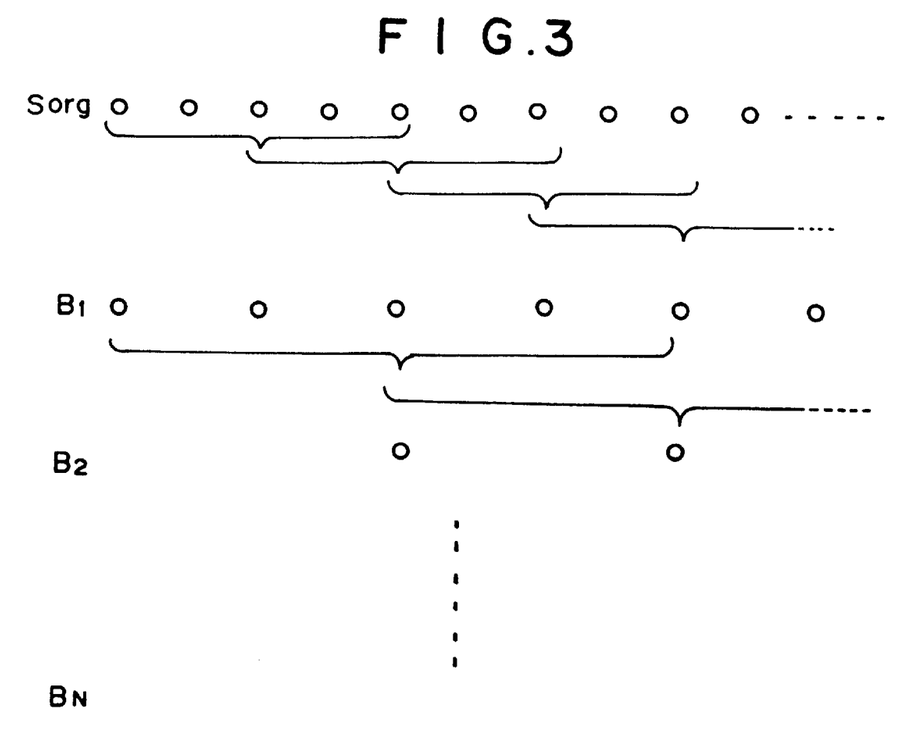
FIG. 3 is an explanatory view showing how a plurality of low-resolution image signals are formed.

FIG. 3 is an explanatory view showing how a plurality of low-resolution image signals are formed. As illustrated in FIG. 3, the filtering process is carried out with respect to the image signal components of the original image signal Sorg or each low-resolution image signal, which represent the picture elements located at every second row and every second column in the array of picture elements of the original image or the low-resolution image represented by the low-resolution image signal. In cases where the filtering process with respect to each of the picture elements of the original image, which are selected at intervals of a single picture element, is thus carried out along each of the x and y directions in the array of the picture elements, the first low-resolution image signal $B_1$ is obtained, which represents a first low-resolution image having a size ¼ times (½ times in each of the x direction and the y direction) as large as the size of the original image. The filtering process is carried out successively on the low-resolution image signals, which are obtained successively from the filtering process, and n number of low-resolution image signals $B_k$, where k=1 to n, are thereby obtained. Each of the low-resolution image signals $B_k$ represents the low-resolution image, which is constituted of a number of picture elements $\frac{1}{2}^{2k}$ times as large as the number of picture elements of the original image.

Figure 4:
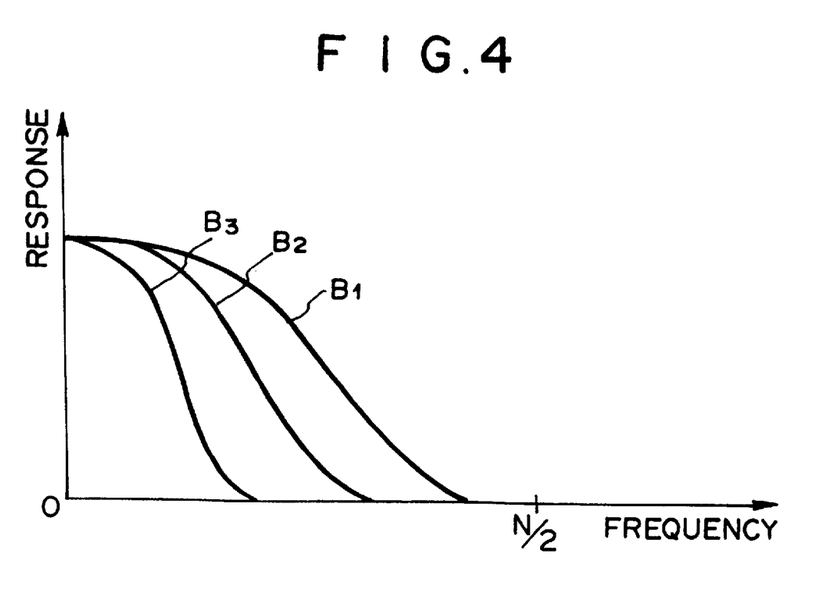
FIG. 4 is a graph showing frequency response characteristics of low-resolution image signals.

FIG. 4 is a graph showing frequency response characteristics of the thus formed low-resolution image signals $B_k$. In FIG. 4, N/2 plotted on the horizontal axis represents the Nyquist frequency. As illustrated in FIG. 45, the low-resolution image signals $B_k$ have the response characteristics such that the high frequency components may have been eliminated successively as the value of k becomes large. In FIG. 4, the response characteristics of only the three low-resolution image signals $B_k$, where k=1, 2, and 3, are shown.

How the interpolating and enlarging process is carried out on the thus obtained low-resolution image signals $B_k$ will be described hereinbelow. As the interpolating operation technique, one of various techniques, such as a B spline technique, may be employed. In this embodiment, the low pass filter in accordance with the Gaussian signal is used in the aforesaid filtering process, and therefore a Gaussian signal is also utilized in the interpolating operation. Specifically, the Gaussian signal represented by Formula (2)

$$I(t) = 2 \cdot \sigma \cdot e^{-\frac{t^2}{2\sigma^2}} \qquad (2)$$

wherein $\sigma = 2^{k-1}$, is utilized.

In the interpolating process for the low-resolution image signal $B_1$, k=1 and therefore $\sigma=1$. In such cases, the filter for carrying out the interpolating process becomes identical with a 5×1 one-dimensional filter shown in FIG. 5. In the interpolating process, firstly, a single picture element having a value of 0 is inserted between two adjacent picture elements in the low-resolution image represented by the low-resolution image signal $B_1$. In this manner, the size of the low-resolution image represented by the low-resolution image signal $B_1$ is enlarged to the same size as the size of the original image. Thereafter, in the interpolating process, a filtering process is carried out on the low-resolution image signal $B_1$, which has been obtained from the insertion of the picture elements having a value of 0, by using the one-dimensional filter shown in FIG. 5.

Figure 5:
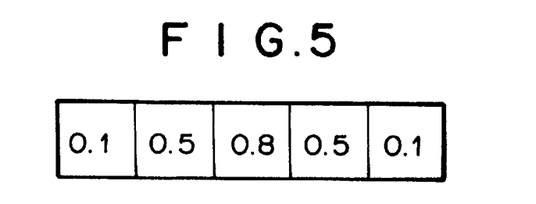
FIG. 5 is an explanatory view showing an example of a filter, which is used in an interpolating and enlarging process.
Figure 6:
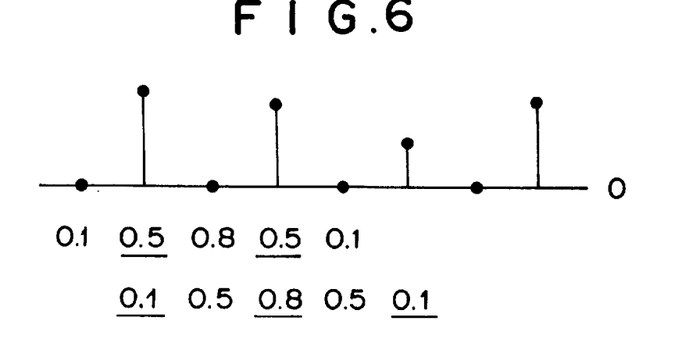
FIG. 6 is an explanatory view showing how a filtering process in an interpolating and enlarging process is carried out.

FIG. 6 illustrates the low-resolution image signal $B_1$, which has been obtained from the insertion of the picture elements having a value of 0, as a one-dimensional pattern. The filter shown in FIG. 5 is the 5×1 filter. As will be understood from FIG. 6, the filtering process, which is carried out by using the filter shown in FIG. 5, becomes substantially equivalent to the filtering process, which is carried out with two kinds of filters, i.e. a 2×1 filter (0.5, 0.5) and a 3×1 filter (0.1, 0.8, 0.1). From the interpolating and enlarging process carried out in this manner, an unsharp image signal Sus1 is obtained, which represents an unsharp image constituted of the same number of picture elements as that of the picture elements of the original image represented by the original image signal Sorg, i.e. which represents the unsharp image having the same size as that of the original image.

Thereafter, an interpolating and enlarging process is carried out on the low-resolution image signal $B_2$. In the interpolating operation for the low-resolution image signal $B_2$, k=2 and therefore $\sigma=2$. In such cases, the filter for carrying out the interpolating process becomes identical with an 11×1 one-dimensional filter shown in FIG. 7. In the interpolating process, firstly, three picture elements having a value of 0 are inserted between two adjacent picture elements in the low-resolution image represented by the low-resolution image signal $B_2$. In this manner, the size of the low-resolution image represented by the low-resolution image signal $B_2$ is enlarged to the same size as the size of the original image. Thereafter, in the interpolating process, a filtering process is carried out on the low-resolution image signal $B_2$, which has been obtained from the insertion of the picture elements having a value of 0, by using the one-dimensional filter shown in FIG. 7.

Figure 7:
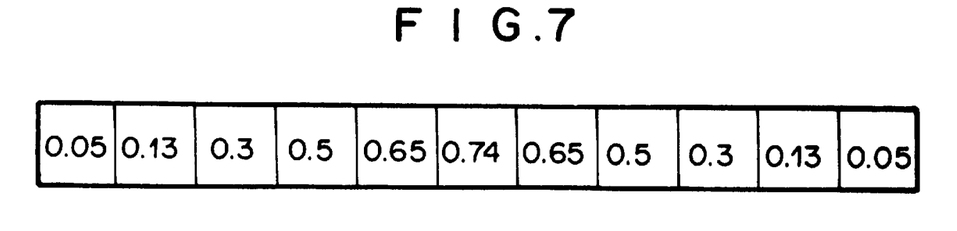
FIG. 7 is an explanatory view showing a different example of a filter, which is used in an interpolating and enlarging process.
Figure 8:
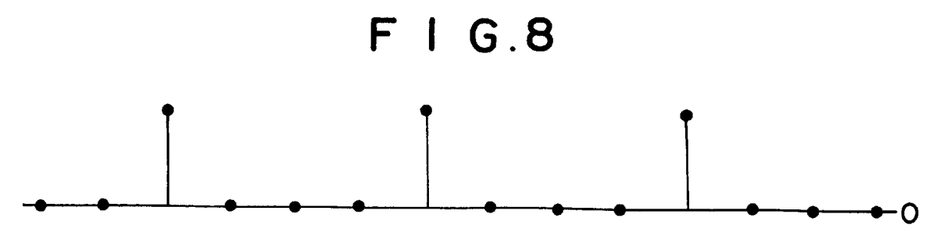
FIG. 8 is an explanatory view showing how a filtering process in an interpolating and enlarging process is carried out.

FIG. 8 illustrates the low-resolution image signal $B_2$, which has been obtained from the insertion of the picture elements having a value of 0, as a one-dimensional pattern. The filter shown in FIG. 7 is the 11×1 filter. As will be understood from FIG. 8, the filtering process, which is carried out by using the filter shown in FIG. 7, becomes substantially equivalent to the filtering process, which is carried out with four kinds of filters, i.e. a 2×1 filter (0.5, 0.5) and 3×1 filters (0.3, 0.65, 0.05), (0.13, 0.74, 0.13), and (0.05, 0.65, 0.3). From the interpolating and enlarging process carried out in this manner, an unsharp image signal Sus2 is obtained, which represents an unsharp image constituted of the same number of picture elements as that of the picture elements of the original image represented by the original image signal Sorg, i.e. which represents the unsharp image having the same size as that of the original image.

The interpolating and enlarging process described above is carried out on all of the low-resolution image signals $B_k$. In the interpolating operation for the low-resolution image signals $B_k$, a filter having a length of $3 \times 2^k - 1$ is prepared in accordance with Formula (2) shown above. Also, $2^k - 1$ number of picture elements having a value of 0 are inserted between two adjacent picture elements of each low-resolution image signal $B_k$, and the size of the low-resolution image represented by the low-resolution image signal $B_k$ is thereby enlarged to the same size as that of the original image. Thereafter, the filtering process is carried out on the low-resolution image signal $B_k$, which has been obtained from the insertion of the picture elements having a value of 0, by using the filter having a length of $3\times 2^k-1$. The interpolating and enlarging process is carried out in this manner.

The filtering process carried out with the filter having a length of $3\times 2^k-1$ becomes equivalent to the filtering process, which is carried out by using a filter having a length of 2 or 3 with a period of $2^k$. Specifically, even though the length of the filter becomes long, the filtering process becomes substantially equivalent to the filtering process carried out with a filter having a length of 2 or 3, and therefore the amount of operations does not become very large. Accordingly, the process for forming the unsharp image signals can be carried out quickly.

The filter used for the filtering process in the interpolating and enlarging process is not limited to the one-dimensional filter and may be a two-dimensional filter. In cases where the two-dimensional filter is employed, even though the filter size becomes large, the filtering process becomes substantially identical with the filtering process in which the 2×2 or 3×3 filter. Therefore, the operation processing can be carried out quickly. Also, in lieu of the filtering process using the filter of the Gaussian signal, the interpolating and enlarging process may be carried out with the B spline interpolating operation or one of various other interpolating operation techniques.

The problems, which the present invention aims at solving, and the means for solving the problems will be described hereinbelow by taking examples. Processes for forming unsharp mask image signals have heretofore been carried out on the assumption that the read-out density, with which the original image signal is acquired, is always the same. When the unsharp mask image signals are to be formed, the read-out density has not heretofore been taken into consideration. However, in the actual image processing system, various kinds of original image signals are received, and the read-out densities, with which the original image signals were acquired, are not necessarily the same. For example, in the radiation image processing system as in this embodiment, the read-out density varies in accordance with the size of the stimulable phosphor sheet. Specifically, the read-out density is set to be 5 lines/mm for a stimulable phosphor sheet having a size of 356×432 mm or a stimulable phosphor sheet having an effective read-out region of 352× 352 mm, 6.7 lines/mm for a stimulable phosphor sheet having a size of 254×305 mm, and 10 lines/mm for a stimulable phosphor sheet having a size of 203×254 mm.

Figure 10:
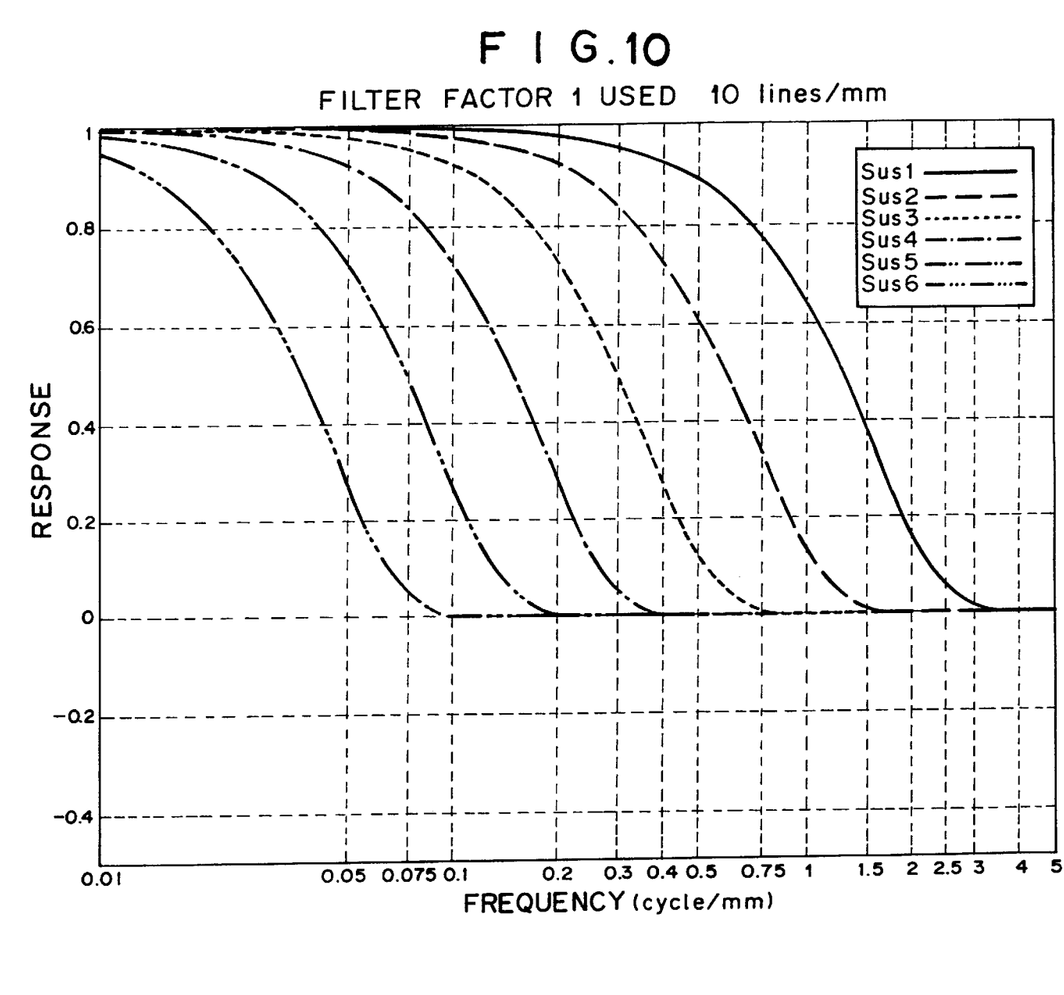
FIG. 10 is a graph showing frequency response characteristics of unsharp mask image signals formed from an original image signal, which has been obtained with a read-out density of 10 lines/mm, by using the filter of FIG. 9.
Figure 11:
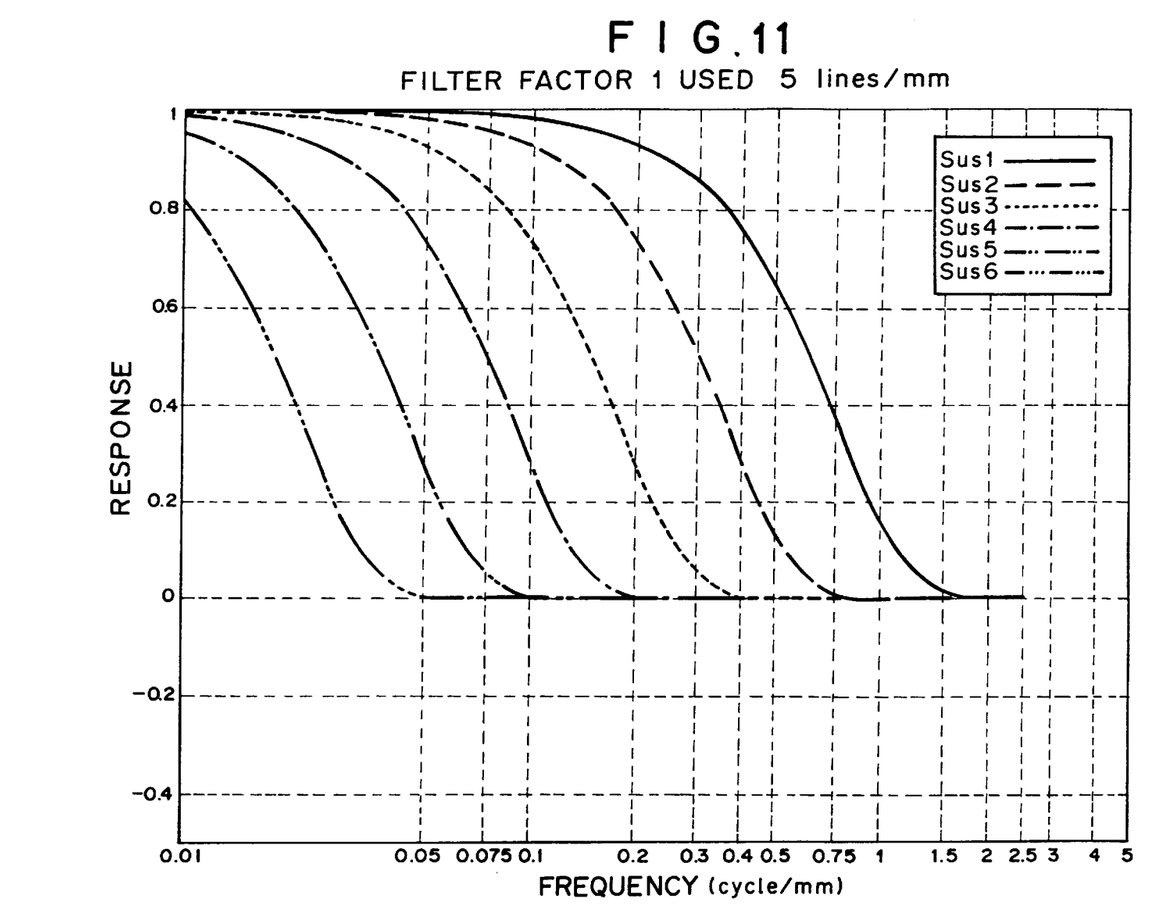
FIG. 11 is a graph showing frequency response characteristics of unsharp mask image signals formed from an original image signal, which has been obtained with a read-out density of 5 lines/mm, by using the filter of FIG. 9.

However, in cases where the filtering processes with the same low pass filter and the interpolating processes with the same interpolating operation are carried out on the original image signals, which have been obtained with different read-out densities, i.e. the original image signals having different Nyquist frequencies, the frequency characteristics of the obtained unsharp mask image signals vary for different read-out densities. By way of example, FIG. 10 shows the frequency response characteristics of the unsharp mask image signals formed by carrying out the filtering process on an original image signal, which has been obtained with a read-out density of 10 lines/mm, by using a one-dimensional filter illustrated in FIG. 9. FIG. 11 shows the frequency response characteristics of the unsharp mask image signals formed by carrying out the filtering process on an original image signal, which has been obtained with a read-out density of 5 lines/mm, by using the one-dimensional filter illustrated in FIG. 9. Also, FIG. 12 shows the frequency response characteristics of the unsharp mask image signals formed by carrying out the filtering process on an original image signal, which has been obtained with a read-out density of 6.7 lines/mm, by using the one-dimensional filter illustrated in FIG. 9.

In the aforesaid process for forming the unsharp mask image signals, the Nyquist frequency of the low-resolution image signal $B_k$, which is obtained from the k'th stage of the filtering process, is equal to ½ of the Nyquist frequency of the low-resolution image signal $B_{k-1}$, which is obtained from the k-1'th stage of the filtering process. Therefore, as will be understood from a comparison of FIG. 10 and FIG. 11, if the Nyquist frequencies are in ½ relationship with each other as in cases where the read-out densities are 10 lines/mm and 5 lines/mm, the frequency characteristics of the unsharp mask image signal Susk, which is obtained from the original image signal having been acquired with the read-out density of 10 lines/mm, and the frequency characteristics of the unsharp mask image signal Susk-1, which is obtained from the original image signal having been acquired with the read-out density of 5 lines/mm, will become identical with each other. Specifically, the unsharp mask image signals having the same frequency characteristics can be formed from the original image signal, which has been acquired with the read-out density of 10 lines/mm, and the original image signal, which has been acquired with the read-out density of 5 lines/mm. Therefore, in such cases, the same nonlinear processing can be carried out by using the same unsharp mask image signals.

Figure 12:
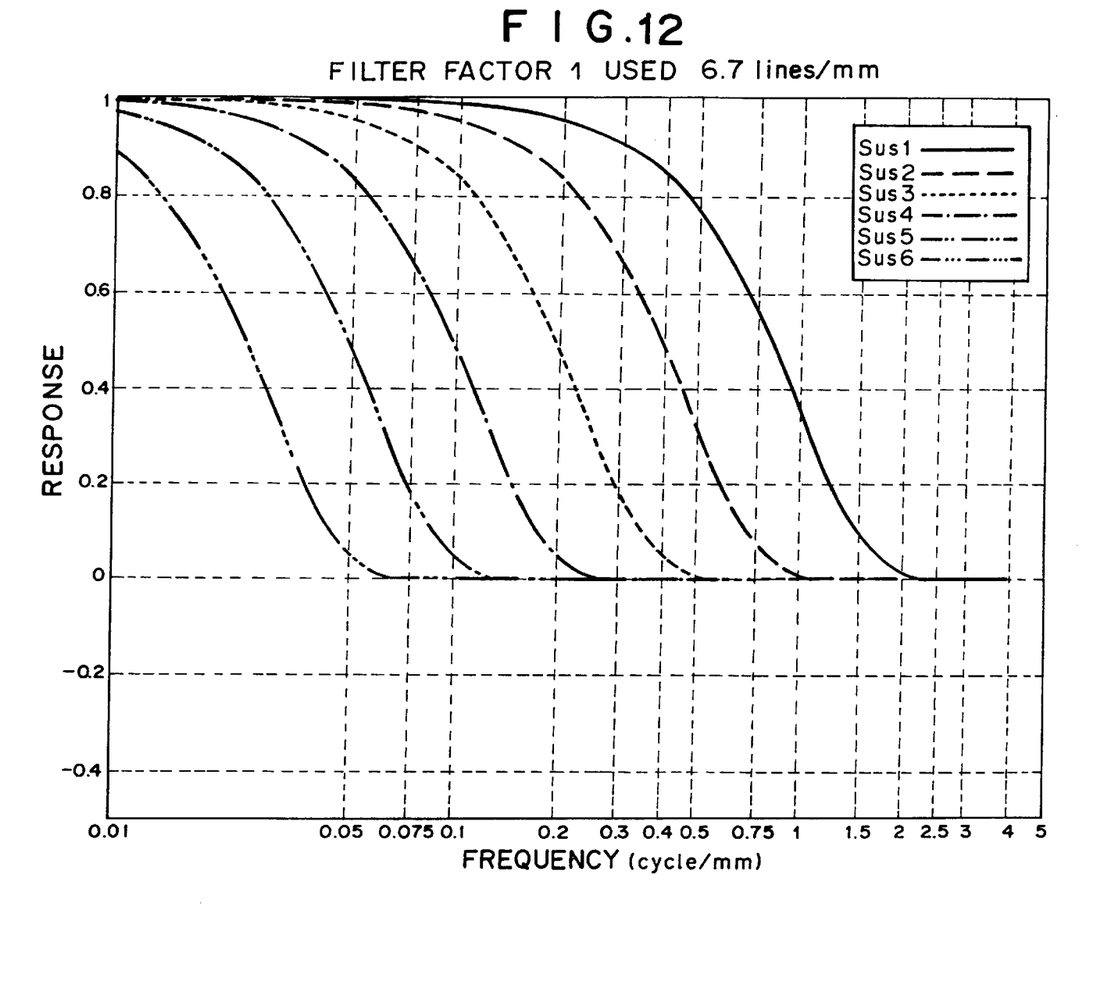
FIG. 12 is a graph showing frequency response characteristics of unsharp mask image signals formed from an original image signal, which has been obtained with a read-out density of 6.7 lines/mm, by using the filter of FIG. 9.

On the other hand, the frequency characteristics of the unsharp mask image signals shown in FIG. 12, which are obtained from the original image signal having been acquired with the read-out density of 6.7 lines/mm, are entirely different from those shown in FIGS. 10 and 11. Therefore, even if the nonlinear processing with the unsharp mask image signals shown in FIG. 12, which have been obtained from the original image signal having been acquired with the read-out density of 6.7 lines/mm, is carried out in the same manner as that for the unsharp mask image signals, which have been obtained from the original image signal having been acquired with the read-out density of 10 lines/mm or 5 lines/mm, the same effects (e.g. the same effects of emphasis of specific frequency components) as those in the cases of the read-out density of 10 lines/mm or 5 lines/mm cannot be obtained.

Figure 9:
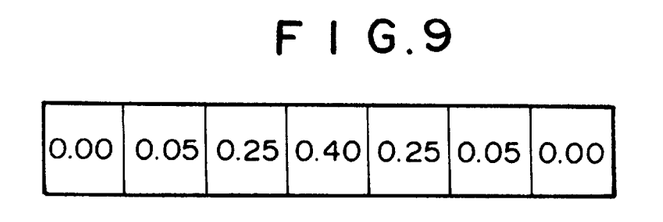
FIG. 9 is an explanatory view showing an example of a filter, which is used in a filtering process for forming a low-resolution image signal.
Figure 13:
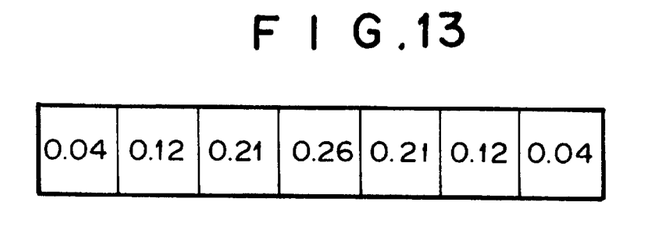
FIG. 13 is an explanatory view showing a different example of a filter, which is used in a filtering process for forming a low-resolution image signal.
Figure 14:
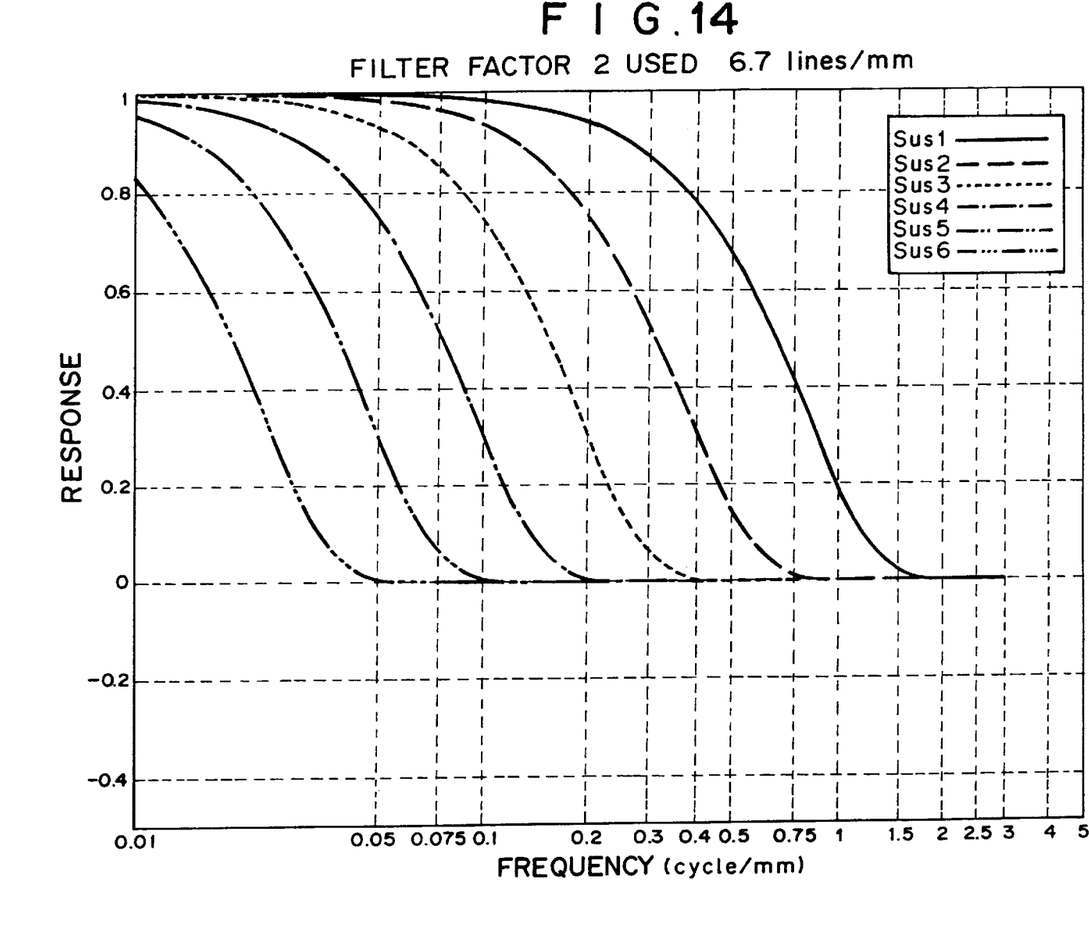
FIG. 14 is a graph showing frequency response characteristics of unsharp mask image signals formed from an original image signal, which has been obtained with a read-out density of 6.7 lines/mm, by using the filter of FIG. 13.

Therefore, in the embodiment of the image processing apparatus in accordance with the present invention, besides the filter shown in FIG. 9, a different filter shown in FIG. 13 is prepared. Also, one of the two filters is used selectively in accordance with the read-out density information. Specifically, the filter shown in FIG. 9 is used in cases where the read-out density is 10 lines/mm or 5 lines/mm, and the filter shown in FIG. 13 is used in cases where the read-out density is 6.7 lines/mm. FIG. 14 shows the frequency response characteristics of the unsharp mask image signals formed from the original image signal, which has been obtained with the read-out density of 6.7 lines/mm, by using the filter of FIG. 13. When FIG. 11 and FIG. 14 are compared with each other, it can be found that the frequency characteristics of the unsharp mask image signals shown in FIG. 14 are approximately identical with the frequency characteristics of the unsharp mask image signals shown in FIG. 11, which are formed by using the filter of FIG. 9 in cases where the read-out density is 5 lines/mm. Specifically, in cases where the read-out density is 6.7 lines/mm, if the unsharp mask image signals are formed by using the filter of FIG. 13, the nonlinear processing may be carried out in the same manner as that for the cases where the read-out density is 10 lines/mm or 5 lines/mm, and the same effects as those in the cases where the read-out density is 10 lines/mm or 5 lines/mm can thereby be obtained.

In the manner described above, in this embodiment, one of the two kinds of filters is used selectively in accordance with the read-out density, with which the original image signal was acquired. However, the number of the kinds of the filters is not limited to two. A plurality of kinds of filters may be prepared in accordance with the number of kinds of the read-out densities corresponding to the original image signals, which are fed into the image processing apparatus, and one of the filters may be used selectively. In this embodiment, the one-dimensional filters are used. Alternatively, two-dimensional filters may be used. In such cases, the same effects as those with the one-dimensional filters can be obtained.

Figure 15:
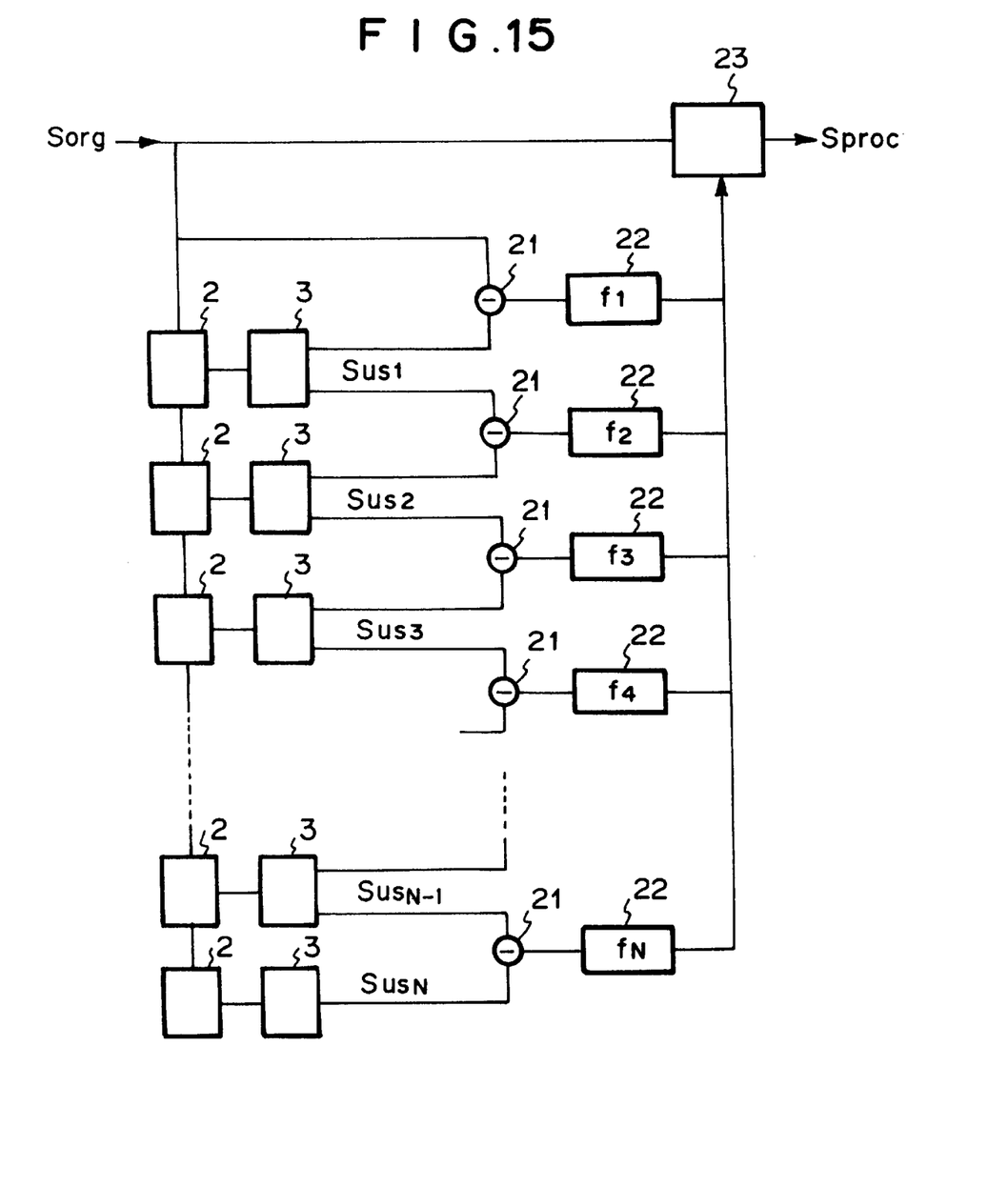
FIG. 15 is a block diagram showing an example of a frequency emphasis processing apparatus.

An example of the nonlinear processing, which is carried out by using the unsharp mask image signals having been formed in the manner described above, will be described hereinbelow. In this example, the frequency emphasis processing described in, for example, U.S. Ser. No. 08/723,313, is employed. FIG. 15 shows an example of the frequency emphasis processing apparatus. As illustrated in FIG. 15, band-limited image signals, which are the components of the original image signal Sorg falling within limited frequency bands, are formed from the original image signal Sorg and the plurality of the unsharp image signals Susk, which have been formed by the filtering means 2 and the interpolating and enlarging means 3. Each of the band-limited image signals is obtained from a subtracter 21, which subtracts the unsharp mask image signals Susk of two adjacent frequency bands (as for the original image signal Sorg, Sorg and Sus1) from each other. Specifically, the values of Sorg - Sus1, Sus1 - Sus2, ..., SusN-1 - SusN are calculated successively, and the plurality of the band-limited image signals are thereby obtained.

Figure 16:
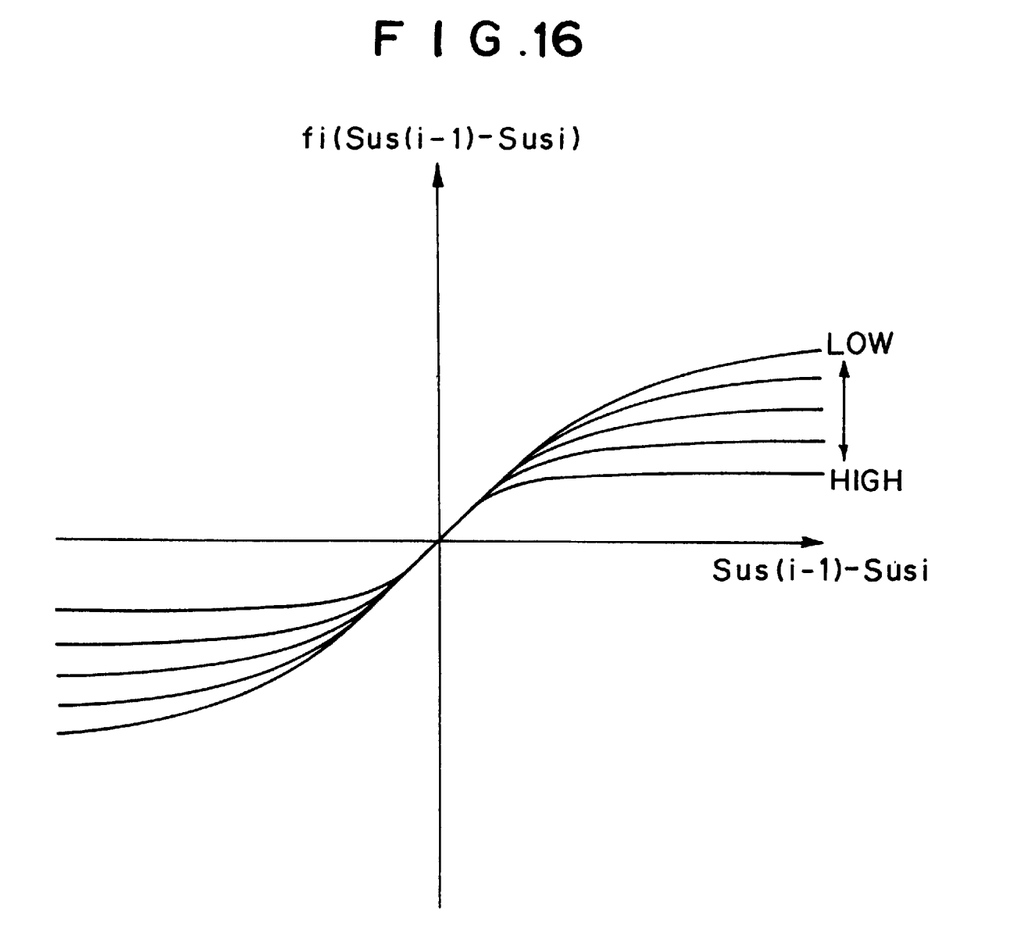
FIG. 16 is a graph showing examples of converting functions used in a converting process carried out on band-limited image signals.

Thereafter, each of the band-limited image signals is converted by a converter 22 in accordance with the corresponding one of functions $f_1$ through $f_N$. By way of example, as the functions $f_1$ through $f_N$, the functions illustrated in FIG. 16 are employed. In FIG. 16, "high" represents the function used for the conversion of a band-limited image signal of a high frequency band, and "low" represents the function used for the conversion of a band-limited image signal of a low frequency band. The functions have the characteristics such that, in a function for processing a high frequency band, the absolute value of the processed signal value, which absolute value is associated with the point in the function where the inclination of the function converges to 0, may take a smaller value than those in the other functions.

Thereafter, in an operation device 23, the band-limited image signals, which have been converted with the functions f, are added to the original image signal Sorg in accordance with a predetermined operation formula, and the respective frequency components are thereby emphasized to extents according to the characteristics of a processed image signal, which is to be obtained. The processing thus carried out may be represented by Formula (3) shown below.

$$Sproc = Sorg + \beta(Sorg) \times Fusm(Sorg, Sus1, Sus2, ..., SusN) \quad (3)$$

$$Fusm(Sorg, Sus1, Sus2, ..., SusN) =$$
$$\{f_1(Sorg - Sus1) + f_2(Sus1 - Sus2) + ... +$$
$$f_k(Susk-1-Susk) + ... + f_N(SusN-1-SusN)\}$$

wherein Sproc represents the processed image signal, in which the high frequency components have been emphasized, Sorg represents the original image signal, Susk (k=1 to N) represents the unsharp mask image signal, $f_k$ (k=1 to N) represents the function for converting the band-limited image signal, and $\beta(Sorg)$ represents the emphasis coefficient determined in accordance with the original image signal.

In the frequency emphasis processing, the addition signal, which is to be added to the original image signal for the purposes of the emphasis, is formed by using the unsharp mask image signals. The frequency emphasis processing is characterized by carrying out a different converting process for each of the frequency bands, such that the signal of each frequency band constituting the addition signal may become a desired signal, and such that no artifact may occur due to the frequency emphasis processing. In order for a desired signal to be formed, the unsharp mask image signal serving as the basis of the desired signal should preferably be a signal having desired characteristics. Specifically, with the conventional image processing method wherein the frequency characteristics of the unsharp mask image signal vary for different read-out density, the effects of the frequency emphasis processing could not be obtained sufficiently. With the image processing method and apparatus in accordance with the present invention, the effects of the image processing can be obtained sufficiently regardless of the read-out density, with which the original image signal was acquired, in the frequency emphasis processing such as the processing described above, or in other kinds of processing, e.g. the dynamic range compression processing.

What is claimed is:

1. An image processing method, comprising the steps of:
   i) reading out an original image with a predetermined read-out density, an original image signal, which represents the original image constituted of a plurality of picture elements, being thereby obtained,
   ii) carrying out a predetermined filtering process on the original image signal by using a predetermined filter, a first low-resolution image signal, which represents a first low-resolution image constituted of a smaller number of picture elements than that of picture elements of the original image represented by the original image signal, being thereby formed,
   iii) carrying out the filtering process on the first low-resolution image signal, a second low-resolution image signal, which represents a second low-resolution image constituted of a smaller number of picture elements than that of picture elements of the first low-resolution image, being thereby formed,
   iv) successively carrying out the filtering process on the respective low-resolution image signals, which are thus obtained successively, a plurality of low-resolution image signals, which represent low-resolution images having different levels of resolution, being thereby formed,
   v) carrying out an interpolating and enlarging process on each of the low-resolution image signals such that the number of picture elements of the low-resolution image represented by each low-resolution image signal may become identical with the number of picture elements of the original image represented by the original image signal, a plurality of different unsharp mask image signals of the original image signal being thereby formed, and
   vi) carrying out predetermined nonlinear processing in accordance with the unsharp mask image signals and the original image signal, wherein a filter having a filter factor, which is determined in accordance with the read-out density, is employed as the predetermined filter.

2. An image processing method as defined in claim 1 wherein said nonlinear processing is frequency emphasis processing.

3. An image processing method as defined in claim 1 wherein said nonlinear processing is dynamic range compression processing.

4. A method of forming unsharp mask image signals, comprising the steps of:

i) reading out an original image with a predetermined read-out density, an original image signal, which represents the original image constituted of a plurality of picture elements, being thereby obtained, ii) carrying out a predetermined filtering process on the original image signal by using a predetermined filter, a first low-resolution image signal, which represents a first low-resolution image constituted of a smaller number of picture elements than that of picture elements of the original image represented by the original image signal, being thereby formed, iii) carrying out the filtering process on the first low-resolution image signal, a second low-resolution image signal, which represents a second low-resolution image constituted of a smaller number of picture elements than that of picture elements of the first low-resolution image, being thereby formed, iv) successively carrying out the filtering process on the respective low-resolution image signals, which are thus obtained successively, a plurality of low-resolution image signals, which represent low-resolution images having different levels of resolution, being thereby formed, v) carrying out an interpolating and enlarging process on each of the low-resolution image signals such that the number of picture elements of the low-resolution image represented by each low-resolution image signal may become identical with the number of picture elements of the original image represented by the original image signal, a plurality of different unsharp mask image signals of the original image signal being thereby formed, wherein a filter having a filter factor, which is determined in accordance with the read-out density, is employed as the predetermined filter.

5. An image processing apparatus, comprising:

i) a filtering means for:

receiving an original image signal, which has been obtained by reading out an original image with a predetermined read-out density and represents the original image constituted of a plurality of picture elements, carrying out a predetermined filtering process on the original image signal by using a predetermined filter, a first low-resolution image signal, which represents a first low-resolution image constituted of a smaller number of picture elements than that of picture elements of the original image represented by the original image signal, being thereby formed, carrying out the filtering process on the first low-resolution image signal, a second low-resolution image signal, which represents a second low-resolution image constituted of a smaller number of picture elements than that of picture elements of the first low-resolution image, being thereby formed, and successively carrying out the filtering process on the respective low-resolution image signals, which are thus obtained successively, a plurality of low-resolution image signals, which represent low-resolution images having different levels of resolution, being thereby formed, ii) an interpolating and enlarging means for carrying out an interpolating and enlarging process on each of the low-resolution image signals such that the number of picture elements of the low-resolution image represented by each low-resolution image signal may become identical with the number of picture elements of the original image represented by the original image signal, a plurality of different unsharp mask image signals of the original image signal being thereby formed, iii) a nonlinear processing means for carrying out predetermined nonlinear processing in accordance with the unsharp mask image signals and the original image signal, iv) a read-out density information input means for inputting information representing the read-out density, and v) a filter factor selecting means for selecting a filter factor of the predetermined filter from a plurality of filter factors, which have been stored previously, the selection being made in accordance with the read-out density, which is inputted as the information from the read-out density information input means.

6. An image processing apparatus as defined in claim 5 wherein said nonlinear processing means carries out frequency emphasis processing.

7. An image processing apparatus as defined in claim 5 wherein said nonlinear processing means carries out dynamic range compression processing.

8. An apparatus for forming unsharp mask image signals, comprising:

i) a filtering means for:

receiving an original image signal, which has been obtained by reading out an original image with a predetermined read-out density and represents the original image constituted of a plurality of picture elements, carrying out a predetermined filtering process on the original image signal by using a predetermined filter, a first low-resolution image signal, which represents a first low-resolution image constituted of a smaller number of picture elements than that of picture elements of the original image represented by the original image signal, being thereby formed, carrying out the filtering process on the first low-resolution image signal, a second low-resolution image signal, which represents a second low-resolution image constituted of a smaller number of picture elements than that of picture elements of the first low-resolution image, being thereby formed, and successively carrying out the filtering process on the respective low-resolution image signals, which are thus obtained successively, a plurality of low-resolution image signals, which represent low-resolution images having different levels of resolution, being thereby formed, ii) an interpolating and enlarging means for carrying out an interpolating and enlarging process on each of the low-resolution image signals such that the number of picture elements of the low-resolution image represented by each low-resolution image signal may become identical with the number of picture elements of the original image represented by the original image signal, a plurality of different unsharp mask image signals of the original image signal being thereby formed, iii) a read-out density information input means for inputting information representing the read-out density, and iv) a filter factor selecting means for selecting a filter factor of the predetermined filter from a plurality of filter factors, which have been stored previously, the selection being made in accordance with the read-out density, which is inputted as the information from the read-out density information input means.

* * * * *